(12) United States Patent
Shimoda et al.

(10) Patent No.: US 6,231,817 B1
(45) Date of Patent: May 15, 2001

(54) EXHAUST EMISSION CONTROL DEVICE AND METHOD OF MANUFACTURING THE SAME

(75) Inventors: Kouhei Shimoda; Syoji Nakagama; Tomohiko Ihara, all of Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/209,264

(22) Filed: Dec. 11, 1998

(30) Foreign Application Priority Data

Dec. 15, 1997 (JP) .................................................... 9-344977

(51) Int. Cl.$^7$ .................................................... B01D 53/94
(52) U.S. Cl. ........................ 422/177; 422/180; 502/327; 502/346
(58) Field of Search .................... 422/171, 177, 422/180; 502/300, 344–346, 325–327, 330–331

(56) References Cited

U.S. PATENT DOCUMENTS

| 3,844,980 | 10/1974 | Sakai et al. ...................... 423/213.5 |
| 3,929,671 | 12/1975 | Nakamura et al. ................. 502/241 |
| 4,274,981 | 6/1981 | Suzuki et al. ..................... 502/178 |
| 4,956,331 | * 9/1990 | Tsurumi et al. ................... 502/339 |
| 5,108,978 | * 4/1992 | Durand et al. .................... 423/213.5 |
| 5,264,186 | * 11/1993 | Harada et al. ..................... 422/174 |

FOREIGN PATENT DOCUMENTS

| 0 727 248 | 8/1996 | (EP) . |
| 59-169534 | 9/1984 | (JP) . |
| 5-64741 | 3/1993 | (JP) . |
| 5-138026 | 6/1993 | (JP) . |

* cited by examiner

Primary Examiner—Hien Tran
(74) Attorney, Agent, or Firm—McDermott, Will & Emery

(57) ABSTRACT

A highly durable exhaust emission control device which is provided in a container disposed in an intermediate portion of an exhaust system, wherein the exhaust emission control device comprises (1) a heat-resistant porous body having communicating pores, (2) a mixture of copper oxide and aluminum oxide supported on the surface of the porous body, and (3) platinum supported on the surface and an inner portion of the mixture, the grain size of the copper oxide being from 0.1 $\mu$m to 50 $\mu$m. The exhaust emission control device is manufactured by preparing the heat-resistant porous body; (2) applying to the porous body a slurry of a mixture of copper oxide and aluminum oxide and/or compounds convertible into these oxides by firing, and baking the mixture and/or compounds; and (3) applying a water-soluble platinum compound to the porous body, and baking the platinum compound. The platinum compound may be applied with the oxide mixture and/or the compounds of copper and aluminum to the porous body.

6 Claims, 1 Drawing Sheet

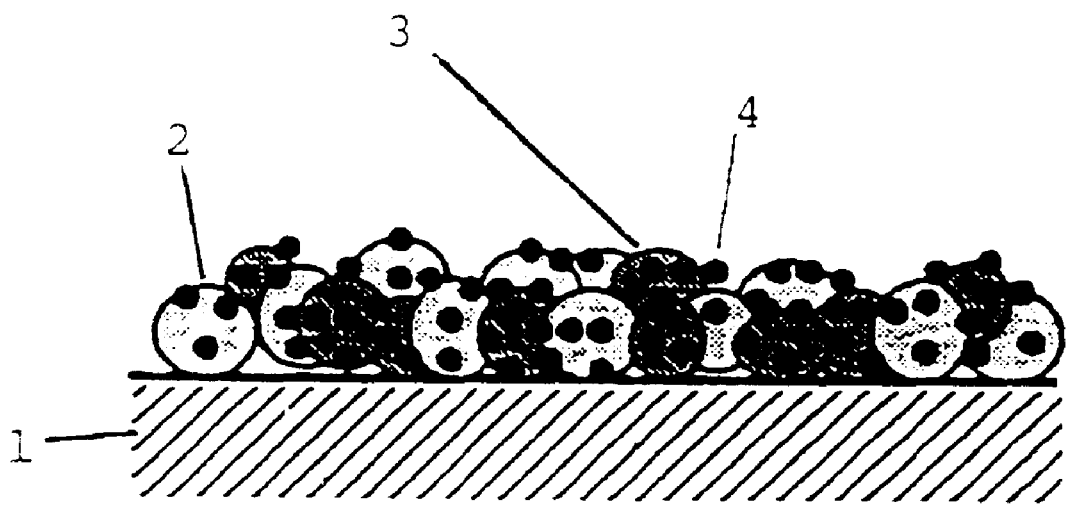

EXHAUST EMISSION CONTROL DEVICE AND METHOD OF MANUFACTURING THE SAME

BACKGROUND OF THE INVENTION

1. Field of the Invention

The present invention relates to an exhaust emission control device for internal combustion engines, and a method of manufacturing the same, and more particularly to an exhaust emission control device which is capable of simultaneously combustion-removing toxic components, such as particulate substances (which will hereinafter be referred to as particulates), CO and hydrocarbon compounds (which will hereinafter be abbreviated to as HC), and which has a high durability, and a-method of manufacturing the same.

2. Description of the Prior Art

In recent years, particulates and NOx contained in exhaust gas discharged from internal combustion engines, especially, diesel engines have become an issue as toxic substances to the environment. Especially, particulates contain particles of an average grain size of not more than 1 $\mu$m, and such particles float in the atmospheric air and are easily taken into human bodies by respiration. Moreover, it has been ascertained by recent clinical test results that these particles contain carcinogens. Therefore, the tightening of the control of the regulations concerning the discharge of these particulates is being discussed mainly in Japan, the U.S.A. and European countries.

Employment of DPF (Diesel Particulate Filter) as a particulate removing means which is adapted to remove particulates by filtering exhaust gas by using a heat-resistant porous body, such as a metal foam, a wire mesh, steel wool, a cell-sealed type ceramic honeycomb, a ceramic foam and open flow type ceramic honeycomb and metal honeycomb as a filter has been discussed. As particulates are collected by DPF, the pressure drop increases, so that a decrease in the engine output and deterioration of the fuel consumption occur. Therefore, the collected particulates are combustion-removed by a burner, an electric heater or a catalyst, thereby regenerating the filter.

The catalysts for burning particulates are roughly divided into noble-metal catalysts and base metal catalysts. A noble metal catalyst has a high durability and a high CO and HC removing performance but the particulate burning effect thereof has a problem. A base metal catalyst has a good particulate burning effect but it has a problem regarding its durability. Namely, the characteristics of the catalyst supported on a filter decrease due to $SO_2$ in the exhaust gas.

The catalysts comprising a combination of a noble metal catalyst and a base metal catalyst include a catalyst comprising a combination of rhodium, copper, silver, iron, magnesium and zinc and disclosed in Japanese Patent Laid-Open No. 169534/1984, a catalyst comprising a combination of palladium and copper oxide and disclosed in Japanese Patent Laid-Open No. 64741/1993, and a catalyst comprising a metal oxide layer of oxides of Cu, Mn, Ni, Fe and Co and a catalyst metal such as platinum supported on the metal oxide layer, and disclosed in Japanese Patent Laid-Open No. 138026/1993.

Among these conventional catalysts, a catalyst having a practicality as well as a durability against $SO_2$-containing exhaust gas has not yet been found out. The exhaust gas temperature of a diesel engine is lower that of a gasoline engine, so that the former engine requires a low-temperature activity of the catalyst correspondingly to this. It has been found out that, when a conventional catalyst is used in a diesel engine exhaust emission control device, the low temperature activity is a problem.

SUMMARY OF THE INVENTION

Therefore, an object of the present invention is to provide an exhaust emission control device having a function of effectively removing toxic components, such as particulates, CO and HC, and having a high durability.

The inventors of the present invention have earnestly studied these problems. Consequently, they have discovered that a combination of copper oxide and platinum the grain sizes of which are within predetermined ranges brings about an excellent-exhaust emission control performance and a high durability and completed the present invention, achieving the present invention.

The present invention provides an exhaust emission control device which is provided in a container disposed in an intermediate portion of an exhaust system, wherein the exhaust emission control device comprises (1) a heat-resistant porous body having communicating pores, (2) a mixture of copper oxide and aluminum oxide supported on the surface of the porous body, and (3) platinum supported on the surface and the inner portion of the mixture, the grain size of the copper oxide being not less than 0.1 $\mu$m and not more than 50 $\mu$m.

One of the methods of manufacturing an exhaust emission control device according to the present invention comprises the steps of (1) preparing a heat-resistant porous body having communicating pores; (2) applying to the heat-resistant porous body a slurry obtained by dispersing in a liquid a mixture of copper oxide and aluminum oxide and/or compounds from which the oxides are produced by slight firing, and baking the mixture and/or compounds; and (3) applying a water-soluble platinum compound to the heat-resistant porous body on which the mixture of the copper oxide and the aluminum oxide has been supported, and baking the platinum compound.

Another method of manufacturing an exhaust emission control device according to the present invention comprises the steps of (1) preparing a heat-resistant porous body having communicating pores, and (2) applying to the heat-resistant porous body a slurry obtained by dispersing in a liquid a mixture of copper oxide and aluminum oxide and/or compounds from which the oxides are produced by slight firing, and a water-soluble platinum compound, and baking the oxide mixture and compounds.

Still another method of manufacturing an exhaust emission control device according to the present invention comprises (1) preparing a heat-resistant porous body having communicating pores; and (2) mixing a mixture of copper oxide and aluminum oxide and/or compounds from which the oxides are produced by slight firing, and a water-soluble platinum compound, drying, firing, and dispersing the mixture in a liquid to obtain a slurry, and applying the slurry to the heat-resistant porous body, and baking the mixture of oxides and the compounds.

BRIEF DESCRIPTION OF THE DRAWING

The single drawing is a schematic sectional view of a particulates trap according to the present invention.

DETAILED DESCRIPTION OF THE PREFERRED EMBODIMENTS

The present invention will now be described in detail. First, the heat-resistant porous body having communicating pores and used in the present invention is preferably a porous body having a high thermal impact resistance, and a pressure drop within an allowable range. A heat-resistant porous body having a particulate collecting performance is more preferable, and the materials for such a porous body include a metal foam, a wire mesh, steel wool, a cell-sealed type ceramic honeycomb, a ceramic foam and open flow type-ceramic honeycomb and metal honeycomb.

The material for the heat-resistant porous body can be a metal such as Fe, Ni, Cr, Al, Mo, Ti, or a rare earth element, an alloy, or a ceramic material such as cordierite, mullite, zirconia, alumina or silicon carbide.

Especially, a metal foam can be preferably used as the material for the heat-resistant porous body.

In a mixture of copper oxide and aluminum oxide supported on the surface of a heat-resistant porous body, the copper oxide is one or more of cuprous oxide ($Cu_2O$), cupric oxide (CuO), and nonstoichiometric compound (CuOx). The grain size of copper oxide used is not less than 0.1 $\mu$m and not more than 50 $\mu$m. When the grain size of copper oxide is smaller than 0.1 $\mu$m, the copper oxides is liable to be poisoned by $SO_2$ contained in exhaust gas, and, as a result, the particulate burning catalytic activity of the copper oxide decreases. When the grain size of the copper oxide is larger than 50 $\mu$m, the surface area thereof decreases, so that the particulate burning performance of the copper oxide is deteriorated. The grain size of the copper oxide can be determined from the average grain size of about 30 particles by microscopic observation using a transmission electron microscope (which will hereinafter be abbreviated to a TEM) or a scanning electron microscope (which will hereinafter be abbreviated to a SEM).

The aluminum oxide can preferable be an aluminum oxide having a γ-type crystalline structure, and 20% or less of at least one selected from the group consisting of rare earth metal oxides and alkali earth metal oxides which are used for the purpose of stabilizing the crystalline structure may be added to the aluminum oxide, causing no problem.

Concerning the mixing ratio of the mixture of copper oxide and aluminum oxide, the copper oxide is preferably contained in an amount of not less than 10 parts by weight but not more than 300 parts by weight based on 100 parts by weight of aluminum oxide. When the content of the copper oxide is less than 10 parts by weight based on 100 parts by weight of aluminum oxide, the particulate burning performance of the copper oxide becomes insufficient. Conversely, when the content of the copper oxide is more than 300 parts by weight based on 100 parts by weight of aluminum oxide, the CO and HC burning performance lowers.

The addition of an alkali metal compound together with aluminum oxide is not preferable since it easily causes a phase transition from a γ-type crystalline structure of the aluminum oxide into an α-type crystalline structure. Therefore, the added amount of the alkali metal compound is limited to not more than 5 wt. % with respect to that of the aluminum oxide.

The grain size of platinum is preferably not less than 1 nm and not more than 100 nm. Setting the grain size of platinum smaller than 1 nm results in a very high manufacturing cost, so that a problems of economical efficiency occurs. Conversely, when the grain size of platinum is larger than 100 nm, the catalytic activity of platinum particles lowers, so that the CO and HC burning performance lowers. The grain size of platinum can be determined on the basis of the average grain size of about 30 particles by microscopic observation using a transmission electron microscope (which will hereinafter be abbreviated to TEM).

The supported amount of platinum is preferably not less than 0.1 part by weight and not more than 5 parts by weight based 100 parts by weight of the mixture of copper and aluminum oxide. When the supported amount of platinum is less than 0.1 part by weight based on 100 parts by weight of the mixture of copper and aluminum oxide, the effect of catalytic activity of platinum is insufficient. Conversely, when the supported amount of platinum is more than 5 parts by weight based on 100 parts by weight of the mixture, the platinum particles become easily large due to the heat history during the endurance running, so that the catalytic performance greatly lowers.

When an exhaust emission control device having the above-described construction is used, particulates can be combustion-removed at a comparatively low temperature, and toxic components, such as CO and HC can be removed at once. Moreover, this device has a high durability.

In a method of manufacturing this exhaust emission control device, a mixture of copper oxide and aluminum oxide and/or compounds from which these compounds are produced by firing is used. The copper oxide used can be at least one selected from the group consisting of a cuprous oxide ($Cu_2O$), cupric oxide (CuO) and a nonstoichiometric compound (CuOx). The compound capable of being used as a compound from which copper oxide is produced by firing can be at least one selected from among copper, copper nitrate, cupric sulfate, copper carbonate, cupric chloride or copper oxalate or the like. The aluminum oxide preferably has a γ-type crystalline structure, and the amount of at least one of rare earth metal oxides and alkali earth metal oxides, which are used for stabilizing the crystalline structure, added to an aluminum oxide may be not more than 20 wt. %, causing no problem. The compound capable of being used to produce aluminum oxide by firing can be aluminum, aluminum hydroxide, aluminum sulfate, aluminum nitrate, aluminum lactate or the like. When one of these compounds is used, at least one selected from among rare earth metal oxides and alkali earth metal oxides may be added in an amount of not more than 20 wt. % to aluminum oxide for stabilizing the γ-type crystalline structure, causing no problem.

The FIGURE schematically shows a section of the exhaust emission control device according to the present invention. In the FIGURE, a mixture of copper oxide 2 and aluminum oxide 3 is supported on a heat-resistant porous body 1 and platinum 4 is further supported on the surface and an inner portion of the oxide mixture.

The present invention will now be described concretely in conjunction with its examples.

EXAMPLE 1

The heat-resistant metal foam was made of an Ni-based metal foam (the commercial name is CELMET) manufactured by the Sumitomo Electric Ind., Ltd., a mixture of copper oxide and aluminum oxide applied to the surface of the foam, and platinum supported on the surface of the mixture. The CELMET comprised as a basic material an Ni material formed by providing an Ni plating layer on an urethane resin foam, which had been treated for imparting conductivity and had a three-dimensional foamed structure, by electroplating and then burning out the resin component by a heat-treatment.

A cylindrical heat-resistant metal foam having communicating pores was obtained by forming CELMET to a cylindrical shape, and alloying the CELMET by means of diffusion coating. This metal foam was subjected to a composition analysis by ICP (Inductive Coupling Type Plasma Emission Spectral) analysis to ascertain that the metal foam contained 22 wt. % of Cr, 7 wt. % of Al, and the balance consisting of Ni and unavoidable components. Powders of cupric oxide (CuO) having grain sizes shown in Table 1 were prepared as copper oxide, and powders of aluminum oxide as well. The aluminum oxide used had a γ-type crystalline phase, in which 1 wt. % of lanthanum oxide was contained for improving the heat resistance.

A uniform slurry was prepared by dispersing a mixed oxide powder containing 50 parts by weight of the cupric oxide and 50 parts by weight of the aluminum oxide in ion exchange water. The specific surface area of the oxide mixture determined by a BET method was 83 $m^2/g$.

The cylindrical heat-resistant metal foam was dipped in the slurry and then drawn up. The excess slurry was removed by air blowing, and the metal foam was fired in the atmospheric air at 600° C. to form an oxide coat layer. The content of oxide was 20 parts by weight based on 100 parts by weight of the heat-resistant metal foam. An aqueous solution of dinitrodiamineplatinum nitrate as a platinum compound aqueous solution was applied to the heat-resistant metal foam and then fired to obtain a cylindrical exhaust emission control device. The amount of platinum supported on the metal foam was 1 part by weight based on 100 parts by weight of oxide.

The cylindrical exhaust emission control device was disposed in a container in such a structure where diesel engine exhaust gas was introduced into the inside of the cylindrical body, and the exhaust gas was made to flowed through the exhaust emission control device to the outside of the cylindrical body. When the exhaust gas passes through the exhaust emission control device, particulates were trapped by the device, and the particulates, CO and HC were combustion-removed using a catalyst.

For this exhaust emission control device, the temperature (temperature at which the pressure drop decreased, which will hereinafter be referred to as a regeneration temperature) at which particulates were ignited and burnt to cause the exhaust emission control device to be regenerated under predetermined conditions that a 6-cylinder natural suction IDI type diesel engine of displacement of 2800 cc was used at a constant rotational speed of the engine of 2800 rpm was determined. The removal rates of CO and HC at an engine rotational speed of 2800 rpm and at a gas temperature of 350° C. at the inlet of the exhaust emission control device were determined by measuring these rates of CO and HC by an ND-IR method and an FID (Hydrogen Flame Ionization) method respectively.

For the evaluation of the device, JIS No. 2 light oil (having a sulfur content of 0.19%) was used. Table 1 shows the regeneration temperatures and CO and HC removal rates of the exhaust emission control devices determined at the initial stage of a continuous endurance test conducted at an engine rotational speed of 3600 rpm with a 100% load, and after 100 hours elapsed from the start of the test. The concentration of $SO_2$ during the continuous endurance test was substantially 56–60 ppm.

As is seen from the results shown in Table 1 below, the regeneration temperatures (at which particulates were ignited and burnt) of the devices according to the present invention are much lower than those of comparative examples even when 100 hours elapsed from the start of the continuous endurance test, which were conducted when the grain size of cupric oxide was in the range of not less than 0.1 μm and not more than 50 μm, this indicating that excellent exhaust gas purification was carried out. Moreover, the devices according to the present invention had CO and HC removing characteristics.

TABLE 1

| Grain size (μm) of cupric oxide | Initial period | | | After endurance test | | |
| --- | --- | --- | --- | --- | --- | --- |
| | Regeneration temperature | CO removal rate | HC removal rate | Regeneration temperature | CO removal rate | HC removal rate |
| 0.03*) | 380° C. | 100% | 65% | 460° C. | 100% | 60% |
| 0.15 | 385° C. | 100% | 62% | 400° C. | 100% | 60% |
| 1.1 | 400° C. | 100% | 63% | 410° C. | 100% | 62% |
| 10 | 405° C. | 100% | 65% | 405° C. | 100% | 61% |
| 35 | 410° C. | 100% | 64% | 410° C. | 100% | 61% |
| 70*) | 480° C. | 100% | 60% | 480° C. | 100% | 60% |
| No cupric oxide | 490° C. | 100% | 61% | 490° C. | 100% | 61% |
| 1.1**) | 470° C. | 45% | 18% | 480° C. | 37% | 15% |

*), **): Comparative examples
**): No Pt

EXAMPLE 2

A copper oxide and an aluminum oxide were mixed at various mixing ratios, and exhaust emission control devices were prepared by the same method as that of Example 1 described, and evaluated. Table 2 shows the mixing ratios of the copper oxide based on 100 parts by weight of aluminum oxide, and the results of evaluation. The copper oxide used has a grain size of 1.1 μm.

As is seen from the results shown in Table 2, the regeneration temperatures (at which the particulates were ignited and burnt) of the devices according to the present invention were much lower than those of comparative examples even after 100 hours from the start of the continuous endurance test, which were conducted with a mixing ratio of the copper oxide to the aluminum oxide being not less than 10 parts by weight and not more than 300 parts by weight based on 100 parts by weight of aluminum oxide, this indicating that excellent exhaust emission control was carried out in the devices of the invention. Moreover, the devices according to the present invention had CO and HC removing characteristics.

TABLE 2

|  | Initial period | | | After endurance test | | |
| --- | --- | --- | --- | --- | --- | --- |
| Mixing amount (parts by weight) of cupric oxide | Regeneration temperature | CO removal rate | HC removal rate | Regeneration temperature | CO removal rate | HC removal rate |
| 5*) | 460° C. | 100% | 63% | 480° C. | 100% | 60% |
| 15 | 415° C. | 100% | 62% | 420° C. | 100% | 61% |
| 100 | 400° C. | 100% | 63% | 410° C. | 100% | 62% |
| 250 | 390° C. | 100% | 60% | 395° C. | 100% | 60% |
| 350*) | 390° C. | 92% | 38% | 400° C. | 85% | 35% |

*): Comparative examples

EXAMPLE 3

Exhaust emission control devices having various platinum grain sizes were prepared by the same method as of Example 1, changing the platinum supporting conditions alone, and then evaluated. Table 3 shows the grain sizes of platinum and the results of evaluation. The grain size of the copper oxide used was 1.1 $\mu$m.

As is seen from the results shown in Table 3, the regeneration temperatures (at which the particulates were ignited and burnt) of the exhaust emission control devices according to the present invention were much lower than that of a comparative example even after 100 hours from the initial period of the continuous endurance tests, which were conducted with a platinum grain size in the range of not less than 1 nm and not more than 100 nm, this indicating that excellent exhaust emission control was carried out in the devices of the invention. Moreover, the devices according to the present invention had CO and HC removing characteristics.

the same method as of Example 1, and evaluated. Table 4 shows the amounts of the supported platinum based on 100 parts by weight of the mixture of copper oxide and aluminum oxide, and the results of evaluation. The grain size of the copper oxide used was 1.1 $\mu$m.

As is seen from the results shown in Table 4, the regeneration temperatures (at which the particulates were ignited and burnt) of the exhaust emission control devices according to the present invention were lower than those of comparative examples even after 100 hours from the initial period of the continuous endurance tests, which were conducted when the amount of platinum supported was in the range of not less than 0.1 part by weight and not more than 5 parts by weight based on the mixture of copper oxide and aluminum oxide, this indicating that excellent exhaust emission control was carried out in the devices of the invention. Moreover, the devices according to the present invention had CO and HC removing characteristics.

TABLE 3

|  | Initial period | | | After endurance test | | |
| --- | --- | --- | --- | --- | --- | --- |
| Platinum grain size (nm) | Regeneration temperature | CO removal rate | HC removal rate | Regeneration temperature | CO removal rate | HC removal rate |
| 2 | 390° C. | 100% | 69% | 400° C. | 100% | 61% |
| 15 | 400° C. | 100% | 68% | 410° C. | 100% | 62% |
| 60 | 415° C. | 100% | 60% | 415° C. | 100% | 60% |
| 120*) | 470° C. | 45% | 17% | 480° C. | 42% | 15% |

*): Comparative example

EXAMPLE 4

Exhaust emission control devices having various amounts of platinum supported on the metal foam were prepared by

TABLE 4

| Amount of platinum supported (parts by weight) | Initial period | | | After endurance test | | |
| --- | --- | --- | --- | --- | --- | --- |
|  | Regeneration temperature | CO removal rate | HC removal rate | Regeneration temperature | CO removal rate | HC removal rate |
| 0.05*) | 430° C. | 65% | 31% | 440° C. | 51% | 27% |
| 0.2 | 405° C. | 100% | 61% | 415° C. | 100% | 60% |
| 1 | 400° C. | 100% | 63% | 410° C. | 100% | 62% |
| 3.5 | 380° C. | 100% | 67% | 405° C. | 100% | 60% |
| 8*) | 380° C. | 100% | 67% | 415° C. | 79% | 33% |

*): Comparative examples

EXAMPLE 5

As heat-resistant porous bodies having communicating pores, a cell-sealed type ceramic honeycomb (400 cells/in$^2$) of cordierite, and a ceramic foam of silicon carbide were prepared. Using these heat-resistant porous bodies, exhaust emission control devices were prepared by the same method as of Example 1, and evaluated. Table 5 shows the amounts of platinum supported on the heat-resistant porous bodies based on 100 parts by weight of the mixture of copper oxide and aluminum oxide, and the results of evaluation. The copper oxide used had a grain size of 1.1 μm.

As is seen from the results shown in Table 5, for any of these heat-resistant porous bodies, the regeneration temperatures (at which the particulates were ignited and burnt) of the exhaust emission control devices according to the present invention were lower than that of the comparative example even after 100 hours from the initial period of the continuous endurance tests, this indicating that excellent exhaust emission control was carried out. Moreover, the devices according to the present invention had CO and HC removing characteristics.

oxide was produced by firing were dispersed in ion exchange water to obtain a uniform slurry.

The heat-resistant metal foam was dipped in this slurry, and then drawn up. The excess slurry was removed by air blowing, and the resultant metal foam was fired in the atmospheric air at 600° C. to form an oxide coat layer. The amount of oxide was 5 parts by weight based on 100 parts by weight of the heat-resistant metal foam. The solutions shown in Table 6 as platinum compound aqueous solutions were applied to the heat-resistant metal foam and then fired to obtain exhaust emission control devices.

These devices were evaluated by the same method as in Example 1. Table 6 shows the platinum grain sizes and the results of the evaluation.

As is seen from the results shown in Table 6, the regeneration temperatures (at which the particulates were ignited and burnt) even by such a manufacturing method were much lower than that of a comparative example irrespective of the

TABLE 5

| Heat-resistant porous body as a filter material | Initial period | | | After endurance test | | |
|---|---|---|---|---|---|---|
| | Regeneration temperature | CO removal rate | HC removal rate | Regeneration temperature | CO removal rate | HC removal rate |
| Cordierite | 410° C. | 100% | 61% | 420° C. | 100% | 59% |
| Silicon carbide | 415° C. | 97% | 56% | 425° C. | 97% | 55% |

EXAMPLE 6

A heat-resistant metal foam was prepared by the same method as in Example 1. 100 parts by weight of cuprous oxide (Cu$_2$O) having a grain size of 1 μm, 50 parts by weight of aluminum oxide, and 50 parts by weight, as oxide, of aluminum nitrate as a compound from which aluminum kind of the platinum compound aqueous solutions even after 100 hours from the initial period of the continuous endurance tests, this indicating that excellent exhaust emission control was carried out. Moreover, the devices according to the present invention had CO and HC removing characteristics.

TABLE 6

| Type of platinum compound solutions | Platinum grain size (nm) | Initial period | | | After the endurance test | | |
|---|---|---|---|---|---|---|---|
| | | Regeneration temperature | CO removal rate | HC removal rate | Regeneration temperature | CO removal rate | HC removal rate |
| Aqueous solution of dinitrodiamine-platinum nitrate | 15 | 395° C. | 100% | 63% | 400° C. | 100% | 62% |
| Aqueous solution of chloroplatinic acid | 6 | 385° C. | 100% | 65% | 410° C. | 100% | 62% |
| Aqueous solution of tetrachloroplatinic acid | 35 | 410° C. | 100% | 61% | 410° C. | 100% | 60% |
| Aqueous solution of tetraammine-platinum nitrate | 12 | 400° C. | 100% | 62% | 405° C. | 100% | 61% |
| Aqueous solution of palladium nitrate*) | 12**) | 495° C. | 85% | 33% | 510° C. | 75% | 26% |

*): comparative example
**): Palladium grain size (nm)

EXAMPLE 7

A heat-resistant metal foam, cupric oxide of a grain size of 1.1 μm as a copper oxide, aluminum oxide, and an aqueous solution of dinitrodiamine-platinum nitrate were prepared by the same method as in Example 1.

50 parts by weight of cupric oxide and 50 parts by weight of aluminum oxide were dispersed in ion exchange water. 20 parts by weight of an aqueous solution of dinitrodiamine-platinum nitrate containing 5 wt. % of platinum was added to the dispersion, thus preparing a uniform slurry.

A cylindrical heat-resistant metal foam was dipped in the slurry, and then drawn up. The excess slurry was removed by air blowing, and the resultant metal foam was fired in a hydrogen atmosphere at 600° C. and then in the atmospheric air at 400° C. to prepare a cylindrical exhaust emission control device. The amount of oxide was 20 parts by weight based on 100 parts by weight of the heat-resistant metal foam, and the amount of platinum supported was 1 part by weight based on 100 parts by weight of the mixture of copper oxide and aluminum oxide. The evaluation of the device was carried out by the same method as in Example 1.

The results of the evaluation showed that the regeneration temperature, CO removal rate and HC removal rate in the initial period were 400° C., 100% and 62% respectively, and that the regeneration temperature, CO removal rate and HC removal rate after 100 hours from the start of the continuous endurance test were 410° C., 100% and 61% respectively. As is seen from these results, the use of this manufacturing method also enables the regeneration temperature (at which the particulates are ignited and burnt) of the inventive exhaust emission control device to be kept low even after 100 hours from the initial period of the continuous endurance test, this indicating that an excellent exhaust emission control operation was carried out. Moreover, this device had CO and HC removing characteristics.

EXAMPLE 8

A heat-resistant metal foam, cupric oxide of a grain size of 1.1 μm as a copper oxide, aluminum oxide and an aqueous solution of dinitrodiamineplatinum nitrate were prepared by the same method as in Example 1.

50 parts by weight of cupric oxide and 50 parts by weight of aluminum oxide were dispersed in ion exchange water. 20 parts by weight of an aqueous solution of dinitrodiamine-platinum nitrate containing 5 wt. % of platinum was added to the dispersion, thus preparing a uniform slurry. This slurry was dried, and fired at 600° C. in a hydrogen atmosphere and then at 400° C. in the atmospheric air. The fired product was slurried by subjecting the same to wet pulverization and dispersion in water by a ball mill. The cylindrical heat-resistant metal foam was dipped in this slurry and drawn up, and excess slurry was then removed by air-blowing. The resultant product was fired at 600° C. in the atmospheric air, thus preparing a cylindrical exhaust emission control device. The amount oxide was 20 parts by weight based on 100 parts by weight of the heat-resistant metal foam, and the amount of platinum supported was 1 part by weight based on 100 parts by weight of the mixture copper oxide and aluminum oxide. The evaluation of the device was carried out by the same method as in Example 1.

The results of the evaluation showed that the regeneration temperature, CO removal rate and HC removal rate in the initial period were 390° C., 100% and 65% respectively, and that the regeneration temperature, CO removal rate and HC removal rate after 100 hours from the start of the continuous endurance test were 395° C., 100% and 64% respectively. As is seen from these results, the use of this manufacturing method also enables the regeneration temperature (at which the particulates are ignited and burnt) of the inventive exhaust emission control device to be kept low even after 100 hours from the initial period of the continuous endurance test, this indicating that an excellent exhaust emission control was carried out. Moreover, this device had CO and HC removing characteristics.

As described above, when the exhaust emission control device according to the present invention is used, particulates, CO and HC are effectively removed.

What is claimed is:

1. An exhaust emission control device which is provided in a container disposed in an intermediate portion of an exhaust system, wherein said exhaust emission control device comprises (1) a heat-resistant porous body having communicating pores, (2) a mixture of copper oxide and aluminum oxide supported on a surface of said porous body, and (3) platinum supported on a surface and an inner portion of said mixture, the grain size of said copper oxide being not less than 0.1 μm and not more than 50 μm.

2. An exhaust emission control device according to claim 1, wherein said mixture of said copper oxide and said aluminum oxide contains 10 parts or more and 300 parts or less by weight of copper oxide based on 100 parts by weight of aluminum oxide.

3. An exhaust emission control device according to claim 1, wherein the mean grain size of said platinum is 1 nm or more and 100 nm or less.

4. An exhaust emission control device according to claim 1, wherein the quantity of said platinum supported on said mixture is 0.1 part or more by weight and 5 parts or less by weight based on 100 parts by weight of said mixture of said copper oxide and said aluminum oxide.

5. An exhaust emission control device according to claim 1, wherein the porous body comprises a metal.

6. An exhaust emission control device according to claim 5, wherein the metal is selected from the group consisting of Fe, Ni, Cr, Al, Mo, Ti, rare earth metals and alloys thereof.

* * * * *